(12) United States Patent
Fujita et al.

(10) Patent No.: US 8,814,552 B2
(45) Date of Patent: Aug. 26, 2014

(54) DIE CLAMPING DEVICE FOR INJECTION MOLDING MACHINE

(75) Inventors: Saburo Fujita, Nagoya (JP); Naoki Kato, Nagoya (JP)

(73) Assignee: Mitsubishi Heavy Industries Plastic Technology Co., Ltd., Nagoya-shi (JP)

( * ) Notice: Subject to any disclaimer, the term of this patent is extended or adjusted under 35 U.S.C. 154(b) by 0 days.

(21) Appl. No.: 13/812,973

(22) PCT Filed: Oct. 26, 2011

(86) PCT No.: PCT/JP2011/074646
§ 371 (c)(1),
(2), (4) Date: Jan. 29, 2013

(87) PCT Pub. No.: WO2012/098745
PCT Pub. Date: Jul. 26, 2012

(65) Prior Publication Data
US 2013/0129858 A1 May 23, 2013

(30) Foreign Application Priority Data
Jan. 17, 2011 (JP) .................................. 2011-007135

(51) Int. Cl.
*B29C 45/64* (2006.01)
(52) U.S. Cl.
USPC ..................... 425/192 R; 425/450.1; 425/589
(58) Field of Classification Search
USPC ................... 425/450.1, 589, 192 R
See application file for complete search history.

(56) References Cited

U.S. PATENT DOCUMENTS

| 5,478,231 | A | * | 12/1995 | Hehl | 425/589 |
|---|---|---|---|---|---|
| 6,132,198 | A | * | 10/2000 | Tamaki et al. | 425/589 |
| 6,821,104 | B2 | | 11/2004 | Kubota et al. | |
| 6,843,647 | B2 | | 1/2005 | Fujita et al. | |
| 7,507,082 | B2 | * | 3/2009 | Kang et al. | 425/589 |

(Continued)

FOREIGN PATENT DOCUMENTS

| EP | 2213436 A1 | 8/2010 |
|---|---|---|
| JP | 60-159613 U | 10/1985 |

(Continued)

OTHER PUBLICATIONS

International Search Report of PCT/JP2011/074646, date of mailing Jan. 31, 2012 (4 pages).

(Continued)

*Primary Examiner* — James Mackey
(74) *Attorney, Agent, or Firm* — Westerman, Hattori, Daniels & Adrian, LLP

(57) ABSTRACT

Breakage of the actuator moving the movable platen in the clamping device of an injection molder is prevented. The clamping device includes a movable platen shifting device increasing and decreasing a horizontal distance between the movable platen (3) and the fixed platen (2). It includes an actuator (41), a clevis pin connecting the actuator (41) and the movable platen (3), a clevis pin holding part holding a central axis of the clevis pin perpendicular to a moving direction of the movable platen (3), and a clevis pin connecting part that connects the actuator (41) and the clevis pin. The clevis pin connecting part is a supporting structure rotating with the clevis pin. The clevis pin connecting part is supported by the movable platen (3). The clevis pin, the clevis pin connecting part, and the front end of the actuator are aligned in a straight line.

13 Claims, 13 Drawing Sheets

(56) References Cited

U.S. PATENT DOCUMENTS

| | | |
|---|---|---|
| 2002/0180132 A1 | 12/2002 | Kubota et al. |
| 2003/0190386 A1 | 10/2003 | Fujita et al. |
| 2006/0240140 A1* | 10/2006 | Banjo et al. ............... 425/450.1 |
| 2010/0227014 A1 | 9/2010 | Kato et al. |

FOREIGN PATENT DOCUMENTS

| | | | |
|---|---|---|---|
| JP | 62-87318 A | | 4/1987 |
| JP | 2-9924 B2 | | 3/1990 |
| JP | 5-269784 A | | 10/1993 |
| JP | 6-270220 A | | 9/1994 |
| JP | 9-1605 A | | 1/1997 |
| JP | 2000-218685 A | | 8/2000 |
| JP | 2001-191334 | * | 7/2001 |
| JP | 2002-127216 A | | 5/2002 |
| JP | 2002-225101 A | | 8/2002 |
| JP | 2002-327826 | * | 11/2002 |
| JP | 3524621 B2 | | 5/2004 |
| JP | 3881850 B2 | | 2/2007 |
| JP | 3938281 B2 | | 6/2007 |
| JP | 4055841 B2 | | 3/2008 |
| JP | 2010-42551 | * | 2/2010 |
| WO | 2009/069324 A1 | | 6/2009 |

OTHER PUBLICATIONS

Written Opinion of PCT/JP2011/074646, date of mailing Jan. 31, 2012 (12 pages).

* cited by examiner

DIE CLAMPING DEVICE FOR INJECTION MOLDING MACHINE

TECHNICAL FIELD

The present invention relates to an opening and closing device of platens of an injection moulder. Particularly, it relates to a connecting device between an operating end of an actuator, which moves a movable platen back and forth, and the movable platen.

Priority is claimed on Japanese Patent Application No. 2011-007135, filed Jan. 17, 2011, the content of which is incorporated herein by reference.

BACKGROUND ART

Conventional opening and closing devices of an injection moulder are disclosed in Patent Literatures 1 and 2. the hydraulic or electric actuator is directly fixed on the movable platen and the fixed platen in the conventional opening and closing devices. Alternatively, the movable platen and the actuator includes the hooking part 61, which provided to the movable platen 3, and the end part of the operation rod 42, which includes a groove part fitting to the hooking part 61 to engage, as shown in FIGS. 16 and 17. In the configuration, the hooking part 61 and the end part of the operation rod 42 of the actuator 41 are connected with clearances S1 and S2 between the hooking part 61 and the end part 45 of the operation rod 42 of the actuator 41

Recently, speed of opening and closing operations becomes faster to improve productivity. When the opening and closing operation is speeded up, the side shoe 13, which is a movement guide of the movable platen 3, could be wore out prematurely. When this wear of the side shoe 13 progresses, the clearance between the side show 13 and the guide rail 11 is widen, triggering inclining and lateral sliding of the movable platen 3.

Also, the viscosity of the raw resin is reduced in order to make it easy to perform injection filling. When the viscosity of the raw resin is reduced, burrs tend to be formed. To prevent the formation of burrs, several countermeasures can be taken, such as increasing the mold locking force. When the mold locking force is increased, deformation of the movable platen and the fixed platen is exacerbated.

If the movable platen 3 is inclined due to the wear of the side shoe 13 or the fixed platen 2 and the movable platen 3 are deformed due to the increasing of the mold locking force, the wear of the side shoe 13 of the movable platen 3, the inclination of the movable platen 3, and the deformation of the fixed platen 2 and the fixed platen 3, cannot be absorbed solely by the clearances S1 and S2 between the hooking part 61 and the end part 45 even if the hooking part 61 and the end part 45 of the operation rod 42 of the actuator 41 were used as a connecting device between the movable platen shifting device 40 and the supporting part 60 fixed to the movable platen 3. As a result, deformation occurs in the connecting part of the operation rod 42 of the actuator 41 (shown as X2 in FIG. 18), leading to breakage of the operation rod 42 due to repeated bending.

RELATED ART DOCUMENT

Patent Document

Patent Document 1: Japanese Unexamined Patent Application, First Publication No. H2-9924

Patent Document 2: Japanese Patent (Granted) Publication No. 3524621

DISCLOSURE OF INVENTION

Problems to be Solved by the Invention

As explained above, the wear of the side shoe 13 of the movable platen 3, the inclination of the movable platen 3, and the deformation of the fixed platen 2 and the movable platen 3 cannot be absorbed by the clearances S1 and S2 alone, which are formed between the hooking part 61 and the end part 45. Because of this, the operation rod 42 of the actuator 41 could be broken by the bending stress repeatedly subjected in the connecting part as shown in FIG. 18.

Furthermore, the tie bars 7 are inclined following the inclination of the movable platen 3 when one ends of the tie bars 7 are accommodated in the clamping cylinders 2a and the other ends of the tie bars 7 are free and held cantilevered in a case where the movable platen 3 is inclined during an opening and closing operation. As a result, galling wear due to the local load generated on the sliding part between the tie bars 7 and the movable platen 3 can be suppressed. However, the movable platen is inclined, since the tie bars 7 cannot correct the inclination of the movable platen 3, in a case where the side shoe 13 is worn excessively as shown in FIG. 20.

Means for Solving the Problems

The above-described problems are solved by the means explained below in the present invention.

(1) The first aspect of the present invention is a clamping device of an injection moulder including: a fixed platen that is fixed to a base; a movable platen that moves along at least two guiding sliding parts fixed to the base in parallel with the base, the movable platen facing the fixed platen during the movement; and a movable platen shifting device that increases and decrease a horizontal distance between the movable platen and the fixed platen, wherein the movable platen shifting device includes: an actuator that moves the movable platen; a clevis pin that connects an end of an operating rod of the actuator and the movable platen; a clevis pin holding part that holds a central axis of the clevis pin perpendicular to a moving direction of the movable platen and fixes the clevis pin to the movable platen; and a clevis pin connecting part that connects the actuator and the clevis pin, wherein: the clevis pin connecting part is a supporting structure rotating with the clevis pin; the clevis pin connecting part is supported by the movable platen through the clevis pin holding part; and the clevis pin, the clevis pin connecting part, and the front end of the actuator are aligned in a straight line.

(2) The second aspect of the present invention is the clamping device of an injection moulder according to (1) described above, wherein the clevis pin has a spherical surface on an outer circumference side surface thereof; and the clevis pin connecting part has a spherical surface on an inner circumference surface thereof facing the clevis pin, the spherical surface of the clevis pin connecting part fitting to the spherical surface of the clevis pin slidably.

(3) The third aspect of the present invention is the clamping device of an injection moulder according to (2) described above, wherein the spherical surface of the clevis pin is a convex surface; and the spherical surface of the clevis pin connecting part is a concave surface.

(4) The fourth aspect of the present invention is the clamping device of an injection moulder according to (2) described above, wherein the clevis pin is a structure in which a cylindrical part and a spherical bush are fitted; the spherical bush has a circular hole, to which the cylindrical part is fixed and fitted slidably; and the spherical bush has a spherical surface on an outer circumference surface thereof.

(5) The fifth aspect of the present invention is the clamping device of an injection moulder according to (2) described above, wherein the clevis pin connecting part and the front end of the actuator is continuously connected with a fastening structure.

(6) The sixth aspect of the present invention is the clamping device of an injection moulder according to (2) described above, wherein the clevis pin is held on the clevis pin holding part at an opposite side part relative to the fixed platen directly or through a connecting block.

(7) The seventh aspect of the present invention is the clamping device of an injection moulder according to (2) described above, wherein: a circumferentially-directed groove is formed at the front end part of the actuator; a truncated cone shape coaxial to the actuator is formed at an end surface of the actuator; the clevis pin connecting part comprises a coupling part, which fits to the circumferentially-directed groove at the front end part of the actuator to engage, and a facing surface, which faces the truncated cone shape at the front end of the actuator; a space is formed between the front end of the actuator and the coupling part at least in a axis direction or a radial direction; and the front end of the actuator is slidably connected to the coupling part.

(8) The eighth aspect of the present invention is the clamping device of an injection moulder according to (2) described above, wherein a circumferentially-directed groove is formed at the front end part of the actuator; a convex spherical end surface coaxial to the actuator is formed at an end surface of the actuator; the clevis pin connecting part comprises a coupling part, which fits to the circumferentially-directed groove at the front end part of the actuator to engage, and a concave spherical surface, which has a larger diameter than a diameter of the convex spherical end surface at the end surface of the actuator in a facing surface thereof facing the convex spherical end surface at the front end part of the actuator; a space is formed between the front end of the actuator and the coupling part at least in a axis direction or a radial direction; and the front end of the actuator is slidably connected to the coupling part.

(9) The ninth aspect of the present invention is the clamping device of an injection moulder according to (7) or (8) described above, wherein the movable platen is moved by abutting a peak surface of the truncated cone shape or the convex spherical surface at the front end of the actuator to the clevis pin connecting part when the movable platen moves away from the fixed platen.

(10) The tenth aspect of the present invention is the clamping device of an injection moulder according to (2) described above, further including a plurality of pairs of movable platen shifting devices, wherein at least one pair of movable platen shifting devices is provided below a horizontal center line of the movable platen.

(11) The eleventh aspect of the present invention is the clamping device of an injection moulder according to (2) described above, further including four tie bars, each of which penetrates though each four corners of the fixed platen and the movable platen, and mold clamping cylinders, which generate cramping force by pulling the tie bars and embedded in the fixed platen, wherein one ends of the tie bars are inserted into the mold clamping cylinders, and other ends of the tie bars are free and in a cantilevered structure.

(12) The twelfth aspect of the present invention is the clamping device of an injection moulder according to (2) described above, wherein the actuator moving the movable platen is a hydraulic actuator.

(13) The thirteenth aspect of the present invention is the clamping device of an injection moulder according to (2) described above, wherein the actuator moving the movable platen is driven by an electric motor.

(14) The fourteenth aspect of the present invention is the clamping device of an injection moulder according to (12) or (13) described above, wherein a mounting structure of the actuator moving the movable platen on the fixed platen or the base includes: a pin, a central axis of which is in the same direction of the central axis of the clevis pin fixed on a side of the fixed platen or a side of the base; a first pin joint connecting part fixing the pin to the side of the fixed platen or the side of the base; and a second pin joint connecting part, which is fixed on a side of the actuator and supports the pin.

Effects of the Invention

The conveyance of the significant inclination of the movable platen due to wearing of the side shoe can be prevented in the clamping devices of an injection moulder defined by the first to thirteenth aspects of the present invention, since the supporting part is rotated with the clevis pin. The movable platen is misaligned vertically when the sliding surface of the platen shoe is worn. Also, the movable platen is slightly deformed during clamping in which vertical and horizontal deformations are combined by the reaction force of the tie bars provided at the four corners. Also, the movable platen is slightly fall (inclined) due to inertia in onset of the opening and closing operation of the platens. The misalignment, the deformation, and the inclination in the horizontal direction are absorbed by the supporting by the clevis pin. The misalignment, the deformation, and the inclination in the vertical direction are relieved by the connecting structure made of the spherical bush. Alternatively, the misalignment, the deformation, and the inclination in the vertical direction are relieved by the combination of the space, which is formed between the front end part of the actuator and the coupling part, and the structure, which is formed in the end surface of the rod and in the truncated cone shape or the spherical shape. Because of these, the breakage of the actuator due to the micro deformation or the inclination of the movable platen can be prevented. Furthermore, the strength of the clevis pin supporting structure part can be improved significantly by adopting the supporting structure with a gap in order to deal with the vertical deformation and inclination, in which the extent of deformation and inclination is slight, and by not adopting another clevis pin supporting structure to deal with the vertical deformation and inclination.

The bending deformation (bending stress) of the rod of the actuator generated by an assembling error can be suppressed by using the clamping devices of an injection moulder defined by the first to fifth aspects of the present invention by allowing the clevis pin and the spherical bush to be slidable each other therebetween even if the location of the rod of the actuator is misplaced by a mounting dimensional tolerance or the like in the axis direction of the clevis pin.

Increasing the stroke of the movable platen when it opens and closes using the long actuator and thinning the minimum platen thickness, which is the total thickness of the movable platen and the fixed platen when the movable platen moves closest to the fixed platen, can be achieved at the same time by using the clamping device of an injection moulder defined by the sixth aspect of the present invention by disposing the fixing position of the clevis pin far from the fixed platen.

Acute-angled contacting of the frond end of the rod of the actuator can be prevented by using the clamping device of an injection moulder defined by the ninth aspect of the present invention by the chamfered part in the edge of the truncated cone shape or the spherical surface formed in the front end of the rod of the actuator, even if the movable platen is inclined when the movable platen moves away from the fixed platen.

The inclination in the initiation of the movement of the movable platen can be prevented by using the clamping device of an injection moulder defined by the tenth aspect of the present invention by decreasing the moment loaded on the movable platen when the sliding part and the operating part move closer to the movable platen to drive the movable platen.

The breakage of the actuator can be prevented by using the clamping device of an injection moulder defined by the eleventh aspect of the present invention even if one ends of the tie bars are accommodated in the clamping cylinders and the other ends of the tie bars are free and held cantilevered, and the movable platen is significantly inclined due to wearing of side shoe.

The breakage of the actuator, which is caused by the excessive bending stress in the fixed platen side of the actuator or the base side mounting part, can be prevented by using the clamping device of an injection moulder defined by the fourteenth aspect of the present invention by rotating the fixed platen side of the platen opening and closing actuator or the base side mounting part horizontally in response to the horizontal inclination and the horizontal misalignment of the movable platen with the pin joint connecting parts.

BEST MODE FOR CARRYING OUT THE INVENTION

In the present embodiments, a structure that solves the wearing problem of the side shoe of the movable platen is applied to a clamping device of a hydraulic injection moulder.

First Embodiment

Figure 1:
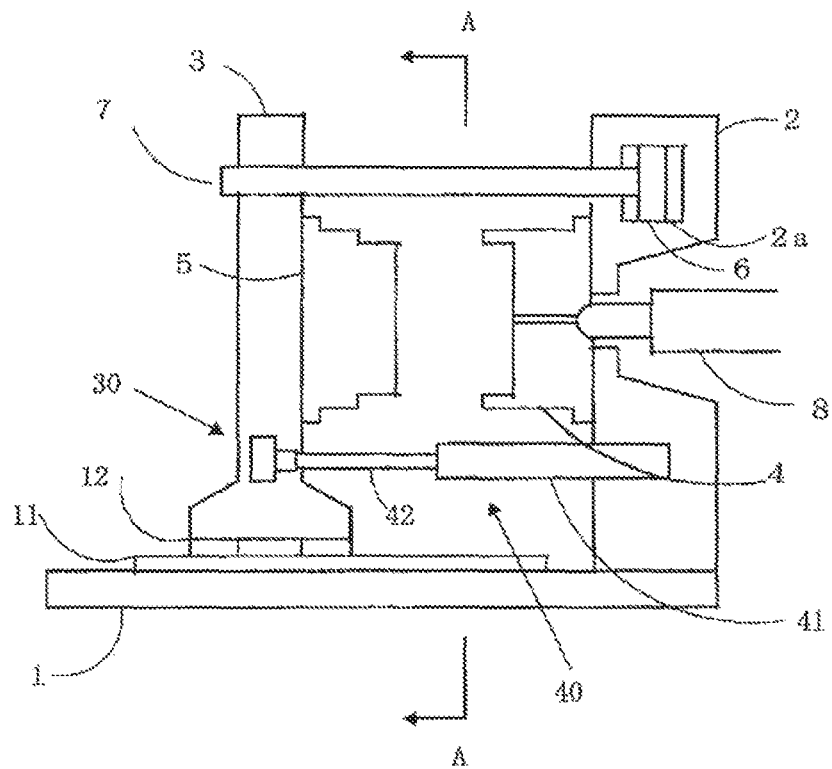
FIG. 1 is a side view of the injection moulder related to the present invention.
Figure 2:
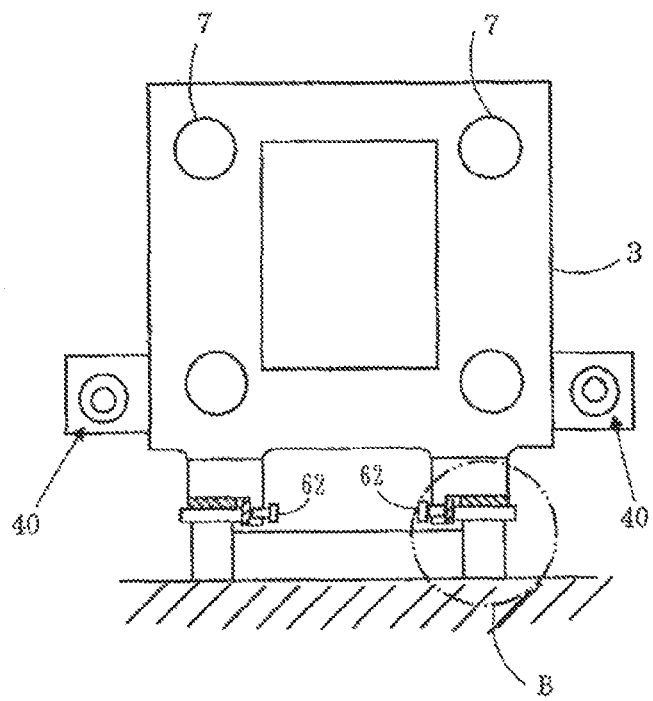
FIG. 2 is a cross-sectional view in the plane A-A.
Figure 3:
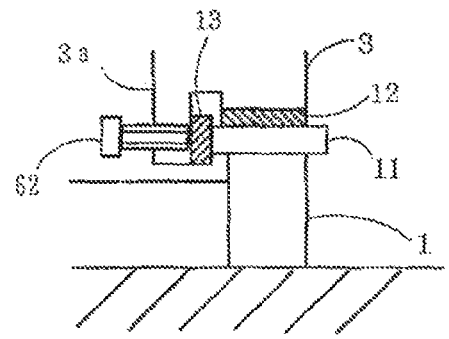
FIG. 3 is an enlarged view of the B part in FIG. 2.
Figure 4:
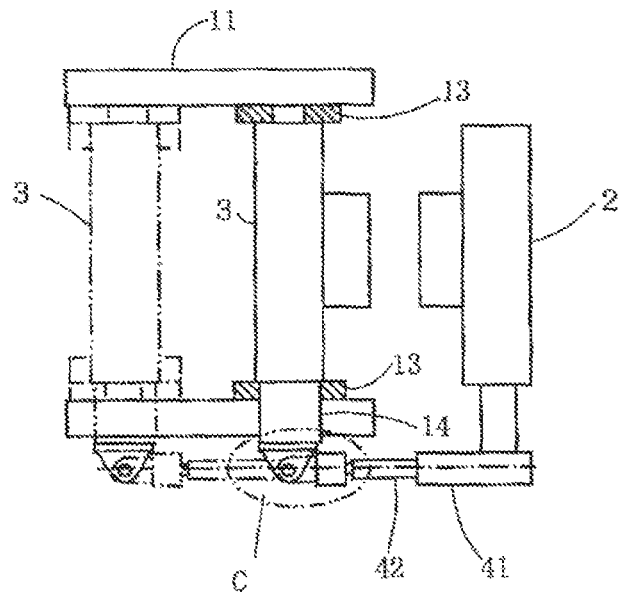
FIG. 4 is a plane view indicating the platens and the device for opening and closing the platens of the injection moulder shown in FIG. 1 (the two-dot chain line indicates the movable platen when the platens are opened).
Figure 5:
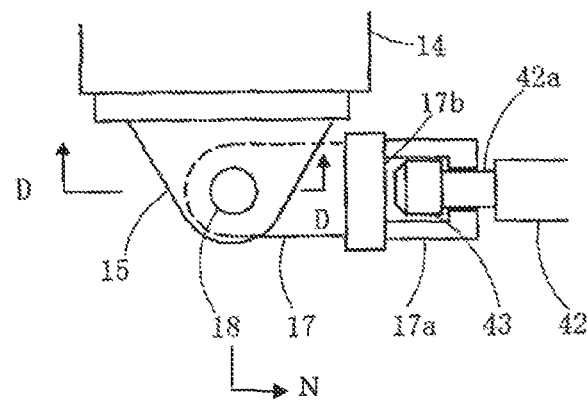
FIG. 5 is a detailed diagram of the platen and the connecting part C of the platen opening and closing device.
Figure 6:
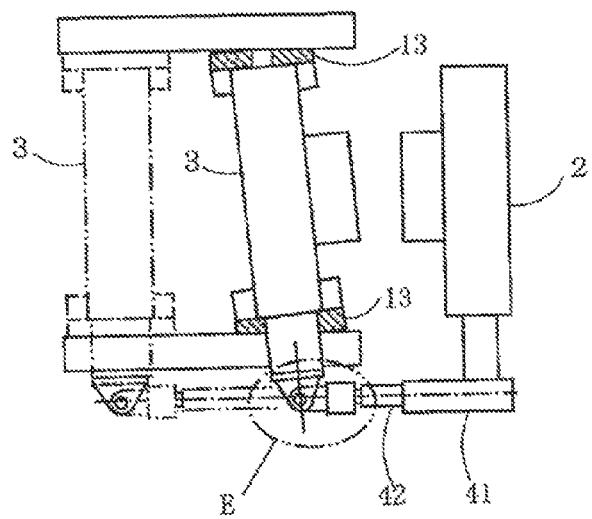
FIG. 6 is a plane view indicating the inclination of the movable platen when the side shoe is unevenly worn.
Figure 7:
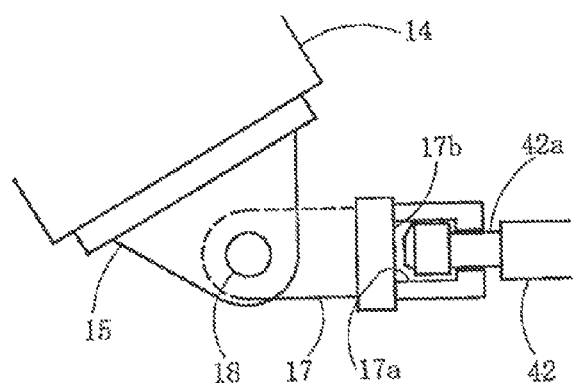
FIG. 7 is an enlarged view of the part E of FIG. 6 (case 1).
Figure 8:
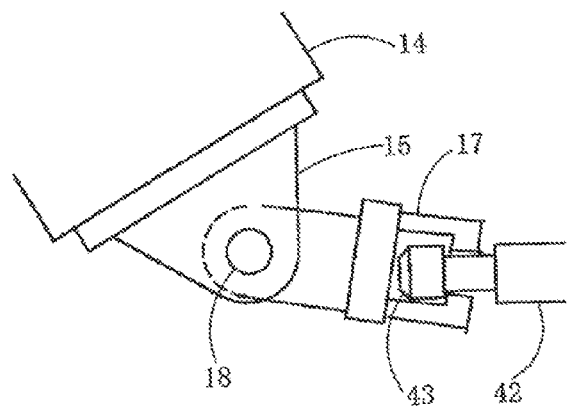
FIG. 8 is an enlarged view of the part E of FIG. 6 (case 2).
Figure 9:
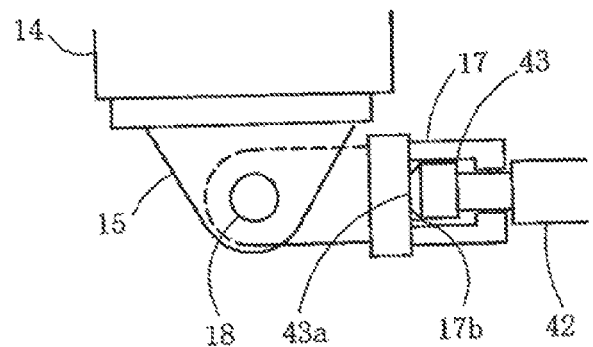
FIG. 9 is an enlarged view indicating the location of the front end of the hydraulic cylinder of the connecting device for opening and closing the platens during the platen opening operation at the part C in FIG. 4.
Figure 10:
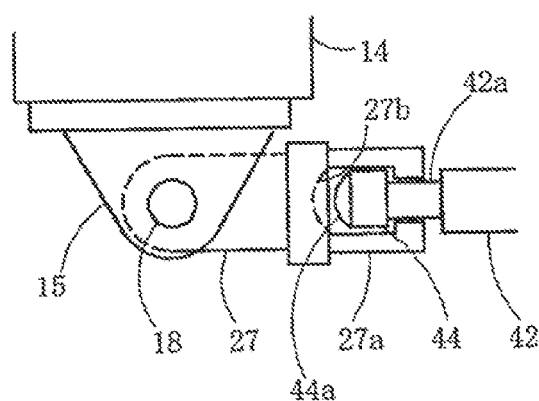
FIG. 10 is an enlarged view indicating the front end part of the operation rod in FIG. 5. The contacting surface of the operation rod is spherical.
Figure 11:
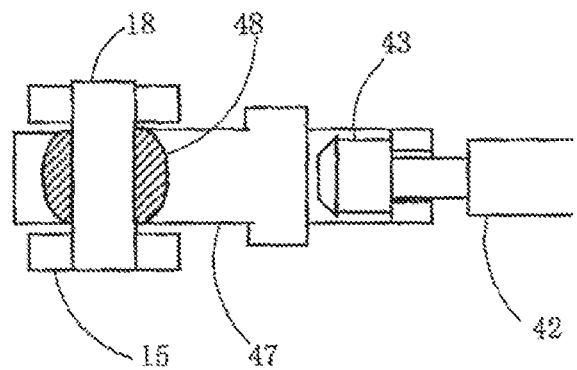
FIG. 11 is a cross-sectional view in the plane D-D indicating an alternative configuration of the platen and the connecting part of the platen opening and closing device in FIG. 5.
Figure 12:
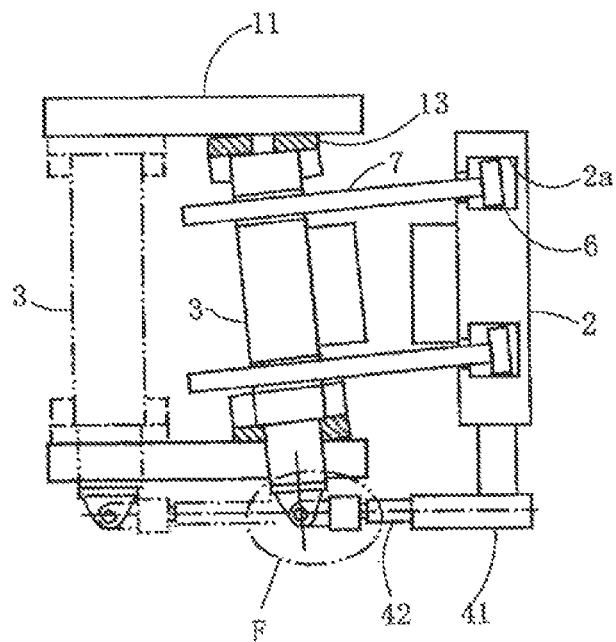
FIG. 12 is a plane view indicating a state where the side shoe is unevenly worn in FIG. 4 and guiding loads are placed on the clamping tie bars.
Figure 21:
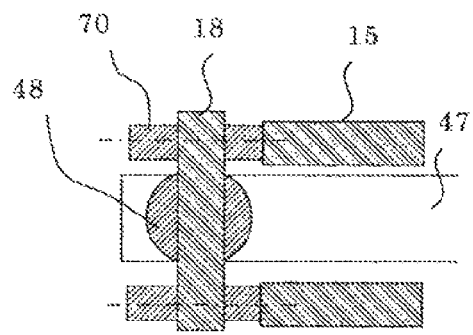
FIG. 21 is a cross-sectional view in the plane D-D indicating an alternative configuration of the platens and the connecting part of the platen opening and closing device shown in FIG. 5.
Figure 23:
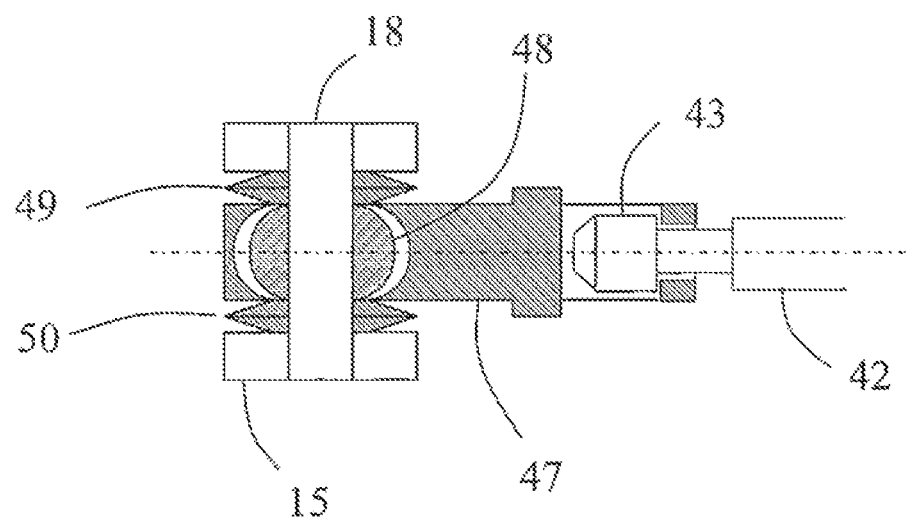
FIG. 23 is a cross-sectional view in the plane D-D indicating an alternative configuration of the platens and the connecting part of the platen opening and closing device shown in FIG. 5.

The first embodiment of the present invention is explained below in reference to drawings. FIG. 1 is a side view of the injection moulder related to the present invention. FIG. 2 is a cross-sectional view in the plane A-A. FIG. 3 is an enlarged view of the B part in FIG. 2. FIG. 4 is a plane view indicating the platens and the device for opening and closing the platens of the injection moulder shown in FIG. 1 (the two-dot chain line indicates the movable platen when the platens are opened). FIG. 5 is a detailed diagram of the platen and the connecting part C of the platen opening and closing device. FIG. 6 is a plane view indicating the inclination of the movable platen when the side shoe is unevenly worn. FIG. 7 is an enlarged view of the part E of FIG. 6 (case 1). FIG. 8 is an enlarged view of the part E of FIG. 6 (case 2). FIG. 9 is an enlarged view indicating the location of the front end of the hydraulic cylinder of the connecting device for opening and closing the platens during the platen opening operation at the part C in FIG. 4. FIG. 10 is an enlarged view indicating the front end part of the operation rod in FIG. 5. The contacting surface of the operation rod is spherical. FIG. 11 is a cross-sectional view in the plane D-D indicating an alternative configuration of the platen and the connecting part of the platen opening and closing device in FIG. 5. FIG. 21 is a cross-sectional view in the plane D-D indicating an alternative configuration of the platens and the connecting part of the platen opening and closing device shown in FIG. 5. FIG. 23 is a cross-sectional view in the plane D-D indicating an alternative configuration of the platens and the connecting part of the platen opening and closing device shown in FIG. 5. FIG. 12 is a plane view indicating a state where the side shoe is unevenly worn in FIG. 4 and guiding loads are placed on the clamping tie bars.

Figure 16:
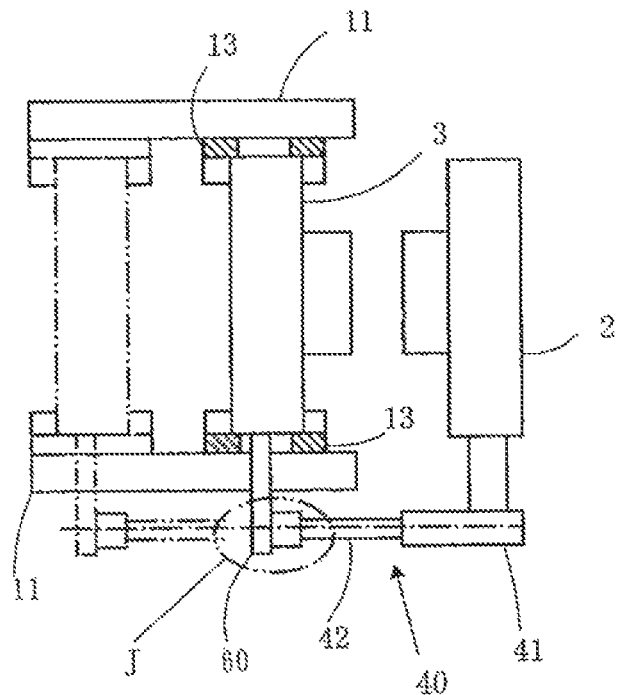
FIG. 16 is a plane view indicating the platens and the platen opening and closing device of the conventional injection moulder (the two-dot chain line indicates the movable platen when the platens are opened).
Figure 17:
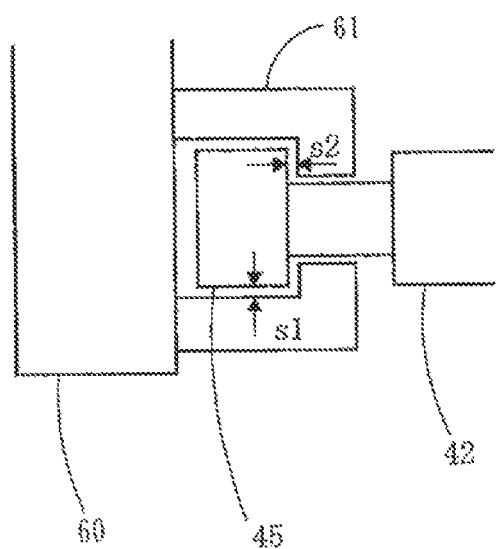
FIG. 17 is an enlarged view of the part J in FIG. 16.
Figure 18:
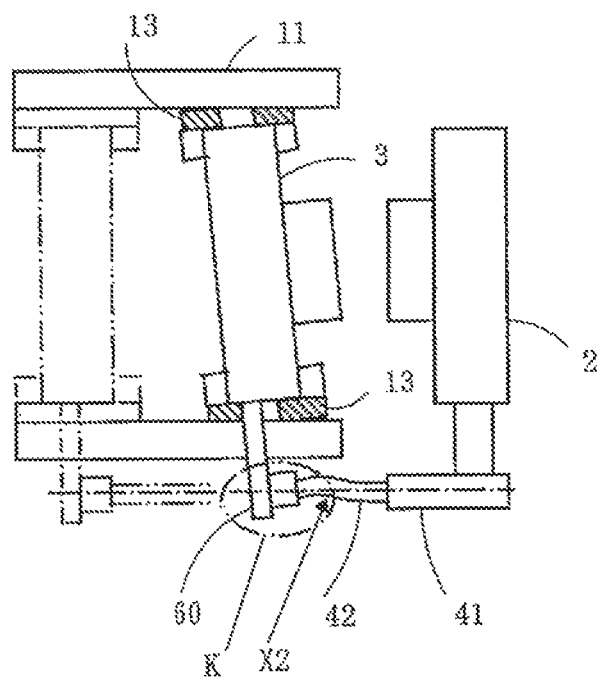
FIG. 18 is a plane view indicating the inclination of the movable platen when the side shoe is unevenly worn in FIG. 16.
Figure 19:
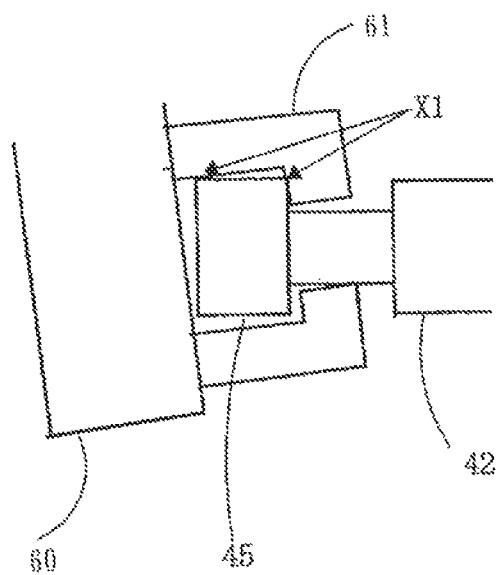
FIG. 19 is an enlarged view of the part K in FIG. 18.
Figure 20:
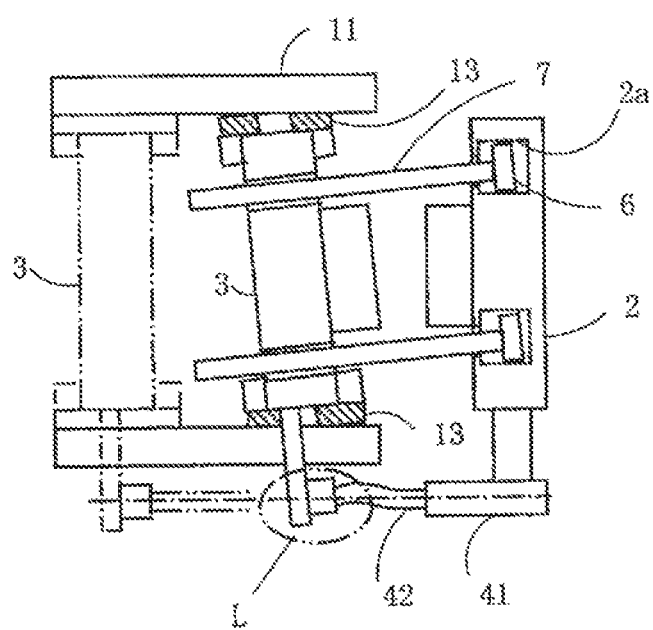
FIG. 20 is a plane view indicating a state where the side shoe is unevenly worn in the conventional injection moulder and guiding loads are placed on the clamping tie bars.

FIG. 16 is a plane view indicating the platens and the platen opening and closing device of the conventional injection moulder (the two-dot chain line indicates the movable platen when the platens are opened). FIG. 17 is an enlarged view of the part J in FIG. 16. FIG. 18 is a plane view indicating the inclination of the movable platen when the side shoe is unevenly worn in FIG. 16. FIG. 19 is an enlarged view of the part K in FIG. 18. FIG. 20 is a plane view indicating a state where the side shoe is unevenly worn in the conventional injection moulder and guiding loads are placed on the clamping tie bars.

As shown in the drawings, the guide rail 11 is laid on the base 1. The fixed platen 2 is fixed on the base 1. The movable platen 3, to which the movable mold is attached, is placed on the guide rail 11 facing the fixed platen 2. The movable platen 3 is able to move along the guide rail 11. The side shoe 12 is provided on the bottom surface of the movable platen 3, which is the sliding surface with the guide rail 11, as a sliding part. Also, the guide part 3a is provided in the lower part of the movable platen 3 to correct the misalignment of the movable platen 3 in the right and left directions with the guide rail 11. Also, The side shoe 13 is provided in the sliding part between the guide part 3a and guide rail 11 as a sliding part. Furthermore, a lubricant such as a grease is filled the space formed between the platen shoe 12 or the side shoe 13 and the guide rail 11 (not shown in the drawings) in order to suppress the sliding wear of the platen shoe and the side shoe 13.

The side shoe 13 is pressed by the adjusting bolt 62 provided to the guide part 3a. With the adjusting bolt 62, abating force between the guide rail 11 and the side shoe 13 is adjusted. In addition, the horizontal center of the movable platen 3 can be aligned or alternatively misaligned to the center of the guide rail placed left and right in FIG. 2 with the adjusting bolt 62. The position of the center of the movable platen 3 can be fine-tuned to be aligned to the center of the fixed platen 2 in order to avoid excessive load such as bending placed on the actuator 41 with the adjusting bolt 62 during movement of the movable platen 3 to the fixed platen 2. The wearing of the side shoe 13 can be reduced effectively, and the breakage of the actuator 41 can be also avoided effectively by this adjusting bolt 62. The side shoe 13 may be attached directly to the guide 3a without using the adjusting bolt 62.

Four large clamping cylinders 2a, which has a short stroke and a large cross-sectional area, are accommodated in the fixed platen 2. The ram 6, which is driven by the clamping cylinder 2a, is connected to the tie bar 7 directly. The tie bars 7 are provided at the four corners of the fixed platen 2 symmetrically with respect to the center line of the fixed platen 2, allowing the clamping operation with hydraulic pressure.

During the closure of the platens, the movable platen 3 moves closer to the fixed platen side, each tie bar 7 penetrates through the penetrating hole of the movable platen 3, and the fixed mold 4 abuts to the movable mold 5. When the fixed mold 4 abuts to the movable mold 5, a tie bar fixing device, which is not indicated in the drawings, fixes the tie bar 7 to the movable platen 3. The reference symbol 8 indicates the injection cylinder.

The movable platen 3 moves along the guide rail 11 provided on the base 1 using the movable platen shifting device 40. With the movement of the movable platen 3, the movable mold 5 can be opened and closed with respect to the fixed mold 4. In the conventional injection moulder, multiple pairs of the movable platen shifting devices 40 are provided. In order to perform the opening and closing of the molds smoothly by sliding the movable platen 3 on the guide rail 11, it is preferable to provide at least one pair of the movable platen shifting devices 40 below the horizontal center line of the movable platen 3. With the configuration, the moment inclining the movable platen 3 can be reduced during the movement of the movable platen 3 (two pairs of the movable platen shifting devices 40 are provided below the horizontal center line of the movable platen 3 in the example shown in FIG. 2).

The hydraulic cylinder is shown as the actuator 41 of the movable platen shifting device 40 in FIG. 1. The actuator 41 of the movable platen shifting device 40 may be an actuator configured in such a way that a ball screw shaft, which is supported by a bearing supported by the base 1 in the radial and thrust directions, is rotationally driven with a servo motor, and the movable platen moves to or away from the fixed platen horizontally by a ball screw nut screwed on the ball screw shaft.

The end of the operation rod 42 of the actuator 41 of the movable platen shifting device 40 and the movable platen 3 are connected to the clevis pin 18 through the clevis pin supporting fork 15, the front end part 43 of the operation rod 42 attached to the fixing part 14 fixed on the movable platen 3, and the clevis pin connecting part 17 as shown in FIGS. 4 and 5. In terms of the method of fixing the clevis pin 18 on the supporting fork 15, any fixing method can be used, such as a simple fixing structure, in which it is supported with a clipping 72 or a key not indicated in the drawing at the end part of the clevis pin, or a fastening fixing structure, in which it is supported tightly with a bolt, as long as the clevis pin 18 is held on the supporting fork 15 without being pulled off.

The central axis of the clevis pin 18 disposed substantially perpendicular to the movement direction of the movable platen 3 and the thickness direction of the guide rail 11 (wear direction). The clevis pin 18, the clevis pin connecting part 17, the actuator 41, and the operation rod 42 are aligned in a horizontal straight line on the center line of the operation rod 42. In the present embodiment, only the drawings, on which all the clevis pin 18, the clevis pin connecting part 17, the actuator 41, and the operation rod 42 are aligned in on the center line of the operation rod 42, are shown. However, at least one of them may be disposed off-center to the center line of the operation rod 42. In a case where, the clevis pin 18, the clevis pin connecting part 17, and the actuator 41 are disposed on the center line of the operation rod 42, stretching force of the operation rod 42 can be transmitted to the clevis pin 18 without loss. In a case where at least one of them is disposed off-center to the center line of the operation rod 42, sliding of the clevis pin connecting part 42 becomes easier, since the stretching force of the operation rod 42 turns to a moment of force assisting the rotation between the clevis pin 18 and the clevis pin connecting part 17. Also, there is no obstacle having the central axis of the clevis pin 18 is inclined about 45° from the vertical direction in the plane perpendicular to the movement direction of the movable platen 3. The clevis pin supporting part 17 is a supporting structure that can be rotated by the clevis pin 18. When the actuator 41 is operated by a control signal from a control unit, which is not shown in the drawings, the front end part 43 of the operation rod 42 pushes or pulls the clevis pin 17 in its axis direction, moving the movable platen 3 through the clevis pin 18. In a case where the movable platen 3 is moved away from the fixed platen 2, the front end part 43a of the operation rod is pressed to the inside wall surface 17b of the clevis pin connecting part 17, and the operation rod 4 is stretched. In a case where the movable platen 3 is moved to the fixed platen 2, the coupling part 17a is hooked on the circumferentially-directed groove 42a formed in the front end part 43 of the operation rod 42, and the operation rod 42 is shorten.

The conventional linking configuration of the end of the operation rod 42 of the actuator 41 of the conventional movable platen shifting device and the movable platen 3 is shown in FIGS. 16 and 17. In the configuration, the front end part 43 of the operation rod 42 of the actuator 41 is accommodated in the hooking part 61 provided to the supporting part 60 fixed on the movable platen 3, the action of the operation rod 42 being transmitted to the movable platen 3. As shown in FIG. 17, spaces S1 and S2 are formed inside of the inner surface of the hooking part 61 and around the outer circumferential surface of the front end part 45 of the operation rod 42, relieving the slight inclination of the movable platen 3. However, when the side shoe 13 of the movable platen 3 is worn, the edge of the front end part 45 of the operation rod 42 contacts with the inner surface of the hooking part 61 as indicated in X1 of the FIG. 19. This eventually leads to the significant bending deformation of the operation rod 42 as shown in FIG. 18, and could cause the breakage of the operation rod after repeated operations.

Contrary to the conventional configuration, the movable platen 3 and the operation rod 42 are connected by the clevis pin 18 through the clevis pin connecting part 17 in the embodiment of the present invention as shown in FIGS. 4 and 5. In the configuration, the clevis pin connecting part 17 can rotate around the clevis pin 18. Thus, the bending deformation of the operation rod 42 will not occur, even if the side shoe 13 is worn and the movable platen 3 is inclined as shown in FIGS. 6, 7, and 12. Consequently, the operation rod will not broken even after the repeated operation. It is preferable that the clevis pin supporting part 17 and the operation rod 42 are formed as different parts allowing them to slide each other as shown in FIG. 5. However, in a case where the movable platen 3 is guided by the highly stiff guiding parts such as the tie bar and the inclination of the movable platen 3 is kept at minimum, the clevis pin connecting part 17 can be fixed by fastening to the front end of the operation rod 42, or a shape of the clevis pin connecting part can be formed in the front end of the operation rod 42 by machining or the like. In addition, it is preferable to provide a baring (not shown in the drawings) or a lubricant supplying hole between the clevis pin 18 and the clevis pin connecting part 17 in order to prevent or suppress the wear in the sliding part between the clevis pin 18 and the clevis pin connecting part 17. Alternatively, in addition to the usage of the bearing or the lubricant supplying hole, inserting a solid lubricating material such as graphite, molybdenum disulfide, or the like, or a surface treatment with a lubricating film, such as DLC (diamond like coating), a ceramic coating, or the like, can be performed. In addition, the clevis pin connection part may include an elastic body, such as a disc spring, a coil spring, a leaf spring, an air spring, a liquid spring, or the like (not shown in the drawings), sandwiching from the top or bottom part of a spherical bush or from the both parts. In this case, the elastic body absorb the load, and the local wearing of the spherical bush can be prevented even if load is placed unevenly in the axis direction of the clevis pin on the spherical bush.

The front end of the front end part 43 of the operation rod 42 of the actuator 41 is in the truncated cone shape. The clevis pin connecting part 17 accommodates the front end part 43 of the operation rod 42. A small space is formed between the inside wall surface 17b of the clevis pin connecting part 17 and the front end part 43 of the operation rod 41 in vertical direction. The front end part 43 can connected slidably with the inner part of the clevis pin connecting part 17.

In stead of the truncated cone shape formed in the front end of the front end part 43 of the operation rod 42, a spherical end surface coaxial to the actuator 41 can be formed as shown in FIG. 10. In this case, it is necessary to form a concave spherical surface having a diameter equals to or larger than the diameter of the convex spherical surface formed in the front end surface 44a of the operation rod 42 on the inside wall surface 27b of the clevis pin connecting part 17, which is abutting to the front end surface 44a of the front end part 44 of the operation rod 42. As such, the clevis pin connecting part can be kept being slidable smoothly with the front end part 43 of the operation rod 42 even if there is a relative misalignment between them during the opening operation of the actuator 41 to open the movable platen 3. The sliding could be even more smooth if a lubricant supplying hole (not shown in the drawings) is provided within the sliding surface of the front end part 43 or the peripheral area of the sliding surface.

The clevis pin 8 shown in FIG. 11 is a fitting structure made of the cylindrical part 19 and the spherical bush 48. The spherical bush 48 has a circular hole inside fitting with the cylindrical part 19 slidably. The outer circumferential surface of the spherical bush 48 is in a convex spherical surface. The spherical bush 48 is fitted into the bearing part of the axis of the clevis pin 18 in the configuration of the clevis pin connecting part 47. In other words, the clevis pin connecting part 47 has a circular hole fitting slidably with the convex spherical surface of the spherical bush 48 in the facing surface to the spherical bush 48 among its inner circumferential surface. The clevis pin connecting part 47 becomes flexible due to the configuration described above. Not only the horizontal inclination perpendicular to the axis direction of the clevis pin 18, but the inclination in the same direction to the axis direction of the clevis pin 18 and the inclination with a vertical component to the axis direction, both of which cannot be absorbed by the clevis pin 18 alone, can be dealt with in such a simple structure. Furthermore, even in a case where there is a mounting dimensional error in the location of the operation rod 42 relative to the axis direction of the clevis pin 18, the clevis pin 18 slide with the spherical bush 48 to suppress the bending deformation (bending stress) of the operation rod 42 that is triggered by the mounting dimensional error.

Also, it is preferable to provide a bearing or a lubricant supplying hole (not shown in the drawings) between the clevis pin 18 and the spherical bush 48 in order to prevent or suppress the wearing of the rotating sliding parts of the clevis pin 18 and the spherical bush 48. Alternatively, in addition to the usage of the bearing or the lubricant supplying hole, inserting a solid lubricating material such as graphite, molybdenum disulfide, or the like, or a surface treatment with a lubricating film, such as DLC (diamond like coating), a ceramic coating, or the like, can be performed. In addition, the clevis pin connection part may include an elastic body, such as a disc spring, a coil spring, a leaf spring, an air spring, a liquid spring, or the like (not shown in the drawings), sandwiching from the top or bottom part of a spherical bush or from the both parts. In this case, the elastic body absorb the load, and the local wearing of the spherical bush can be prevented even if load is placed unevenly in the axis direction.

The clevis pin connecting part 47 includes the coupling part 17a. The clevis pin connecting part 47 has a structure in which the operation rod 42 and the clevis pin connecting part 47 are connected in a coupling connection. However, there is no obstacle having the clevis pin connecting part 47 and the operation rod 42 to be fastened directly.

In addition, the circular hole corresponding to the convex spherical surface of the spherical bush 48 is directly formed on the inner circumferential surface of the clevis pin connecting part 47 in the present embodiment. However, the part with the circular hole can be a separated part, which is mounted fittingly on the clevis pin connecting part 47.

Furthermore, the clevis pin 18 and the spherical bush 48 are separated parts fitting each other in the present embodiment. However, there is no obstacle having the both of them to be formed integrally, and having the outer circumferential surface of the clevis pin 18 in a convex spherical surface.

Figure 22:
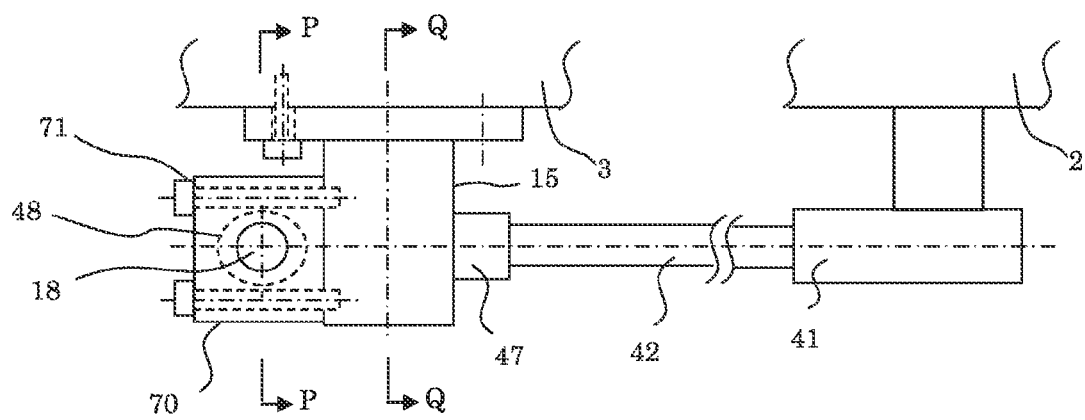
FIG. 22 is a plane view of the platens and the connecting part configured as in FIG. 21.

In addition, the clevis pin 18 may be fitted to the connecting block 70 to fix the connecting block 70 by fastening to the supporting fork 15 with a bolt 71 as shown in FIGS. 21 and 22, for example. In this case, the clevis pin 18 is fixed through the supporting fork 15, which is fixed tightly to the movable platen 3, and the connecting block 70. Therefore, the operation rod 42 can be mounted connectively to the supporting fork 15 easily, and the abnormal wearing of the sliding surface, which is triggered by the local uneven wear on the sliding surface between the clevis pin 18 and the spherical bush 48, can be prevented, can be prevented, since the location misalignment can be absorbed by the mounting clearance of the connecting block 70, such as the fitting clearance between the bolt 71 and the connecting block 70, even if the heavy operation rod 42 deflects by its own weight or the relative locations of the supporting fork 15 and the clevis pin connecting part 47, which is provided to the front end of the operation rod 42, are misaligned.

In addition, it is preferable that the connecting block 70 is mounted in the opposite side of the supporting fork 15 relative to the foxed platen 2 as shown in FIGS. 21 and 22 (to the far side of the supporting fork 15 from the fixed platen 2). In this case, the stroke of the movable platen 3 movement (expansion and contraction stroke of the operation rod 42) can be stretched since the long actuator 41 can be mounted. Further, the minimum distance between the movable platen 3 and the fixed platen 2 in the state where they are moved closest by retreating the operation rod 42 in the maximum level (the actuator 41 is contacted to the minimum length). Because of this, molding can be performed with a thicker molds rather than a thinner molds, relieving the upper thickness limit of the molds to be mounted. Also, the movement stroke of the movable platen 3 to obtain the necessary space for ejection of the molded product, making it easier to recover the molded product in a larger size. Also, the maintenance workability in a situation where an operator enters the space between the movable platen 3 and the fixed platen 2 is improved during the machine stoppages.

Furthermore, the operation rod 42 deflects and deforms easily and the location misalignment can be absorbed easily by using the long operation rod 42 even if the operation rod 42 deflects by its own weight and the relative locations of the supporting fork 15 and the clevis pin connecting part 47, which is provided to the front end of the operation rod 42, are misaligned by the mounting dimensional error. Also, the uneven placement of the load on the sliding surface between the clevis pin 18 and the spherical bush 48 can be relieved easily by the deflecting deformation of the operation rod 42. In a case where the deflection of the operating rod 42 by its own weight and the extent of the misalignment between the supporting fork 15 and the clevis pin connecting part 47 provided to the front end of the operation rod 42 due to the mounting dimensional error are slight enough to be absorbed with the deflection of the long operation rod 42, the connecting block 70 can be integrally formed in a single piece, instead of the assembled structure in which the connecting block 70 and the supporting fork 15 are formed separately. The same is true in a case where a simplified assembly or manufacturing cost reduction of the supporting fork is needed.

In the configuration of the clevis pin connecting part shown in FIG. 23, the bush 48 shown in FIG. 11 is sandwiched by the elastic bodies 49, 50. In the connecting part, the inclination of the movable platen 3 is transmitted to the clevis pin connecting part 47 as a decentering force through the clevis pin 18. As a result, a reaction force can be placed to correct back the location of the central axis of the clevis pin connecting part 47 to the originally designed center position by the elastic bodies 49, 50 even in a case where the central axis of the clevis pin connecting part 47 from the originally designed center position, which is the best position functionally. Also, by selecting the elastic bodies 49, 50 having a proper spring coefficient, the generation of the excessive bending stress to the operation rod 42 can be prevented, and the reaction force can be placed to correct back the location of the central axis of the clevis pin connecting part 47 to the originally designed center position at the same time.

The elastic bodies 49, 50 shown in FIG. 23 are indicated as disc springs. However, there is no obstacle substituting the disc springs with coil springs, leaf springs, air springs, liquid springs, or other types of spring parts. Also, there is no obstacle that only the upper side elastic body 49 alone, or the lower side only the elastic body 50 is used. In addition, in a case where the both elastic bodies 49, 50 are provided, at least one of the elastic bodies 49, 50 can be used as a shock absorber. Alternatively, in a case where only the elastic body 49 (or the elastic body 50) alone is provided, the elastic body 49 (or the elastic body 50) can be used as a shock absorber. In these cases, the load place on the operation rod 42 can be absorbed even if the movable platen 3 is suddenly inclined, preventing the breakage of the operation rod 42.

In the present embodiment, the coupling parts 17*a*, 27*a* of the clevis pin connecting parts 17, 27, which fits to the front end part 43 of the actuator 42 to engage, are shown as an integral structure. However, a separated part can be connected to the clevis pin connecting parts 17, 27, as the coupling parts 17*a*, 27*a*. The breakage of the operation rod can be suppressed by adopting the connected-structure, since the bending deformation in the operation rod 42 during the inclination of the movable platen 3 can be absorbed by sliding or separation at the connecting part between the clevis pin connecting parts 17, 27 and the coupling parts 17*a*, 27*a*.

Also, different materials can be used for the main bodies of the clevis pin connecting parts 17, 27 and for coupling parts 17*a*, 27*a*. Specifically, a softer material than the material used for the operation rod 42 can be used for the clevis pin connecting parts 17, 27, or the coupling parts 17*a*, 27*a*. Because of this, bending stiffness of the clevis pin connecting parts 17, 27, or the coupling parts 17*a*, 27*a* can be reduced. Furthermore, a softer material than the material of the clevis pin connecting parts 17, 27 can be used for the coupling parts 17*a*, 27*a*.

Also, the clevis pin connecting parts 17, 27, or the coupling parts 17*a*, 27*a* may be in a shape having less bending stiffness than the operation rod 42. Because of this, the breakage of the operation rod 42 can be suppressed, since the bending stress in the operation rod 42 during the inclination of the movable platen 3 can be absorbed by bending deformation of the clevis pin connecting parts 17, 27 or the coupling parts 17*a*, 27*a*. In a case where forming the circumferentially-directed groove 42*a* in the front end part of the operation rod 42 is impossible due to an insufficient strength of the operation rod 42, because the operation rod 42 is too thin for example, the clevis pin connecting parts 17, 27 can be provided directly in the front end part of the operation rod 42 integrally without the coupling parts 17*a*, 27*a*. Also, in order to machine the circumferentially-directed groove 42*a* easily, the front end part 43 of the operation rod 42 and the operation rod 42 can be produced as separated parts, and combined by screw fastening or the like after each machining process.

Second Embodiment

The difference of the second embodiment from the first embodiment is the configuration connecting the hydraulic cylinder to the fixed platen side. Other configuration of the second embodiment is the same to the first embodiment, and their effects are the same too. Therefore, explanations for the shared parts are omitted.

Figure 13:
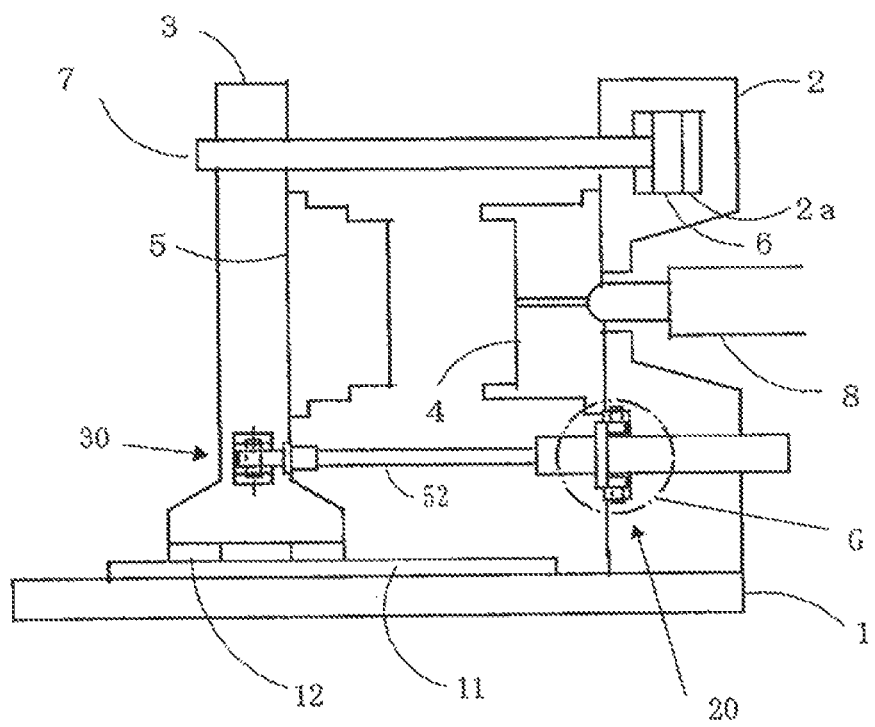
FIG. 13 is a side view of the injection moulder related to the second embodiment of the present invention.
Figure 14:
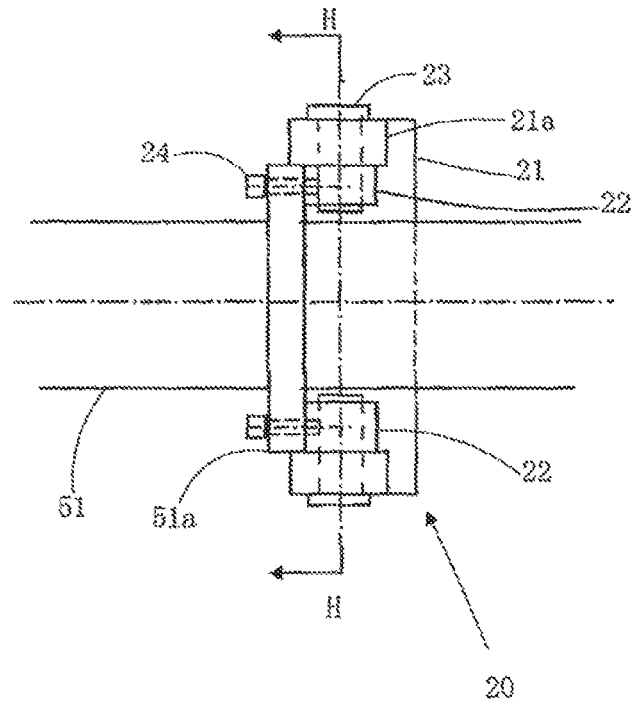
FIG. 14 is an enlarged view of the part G in FIG. 13.
Figure 15:
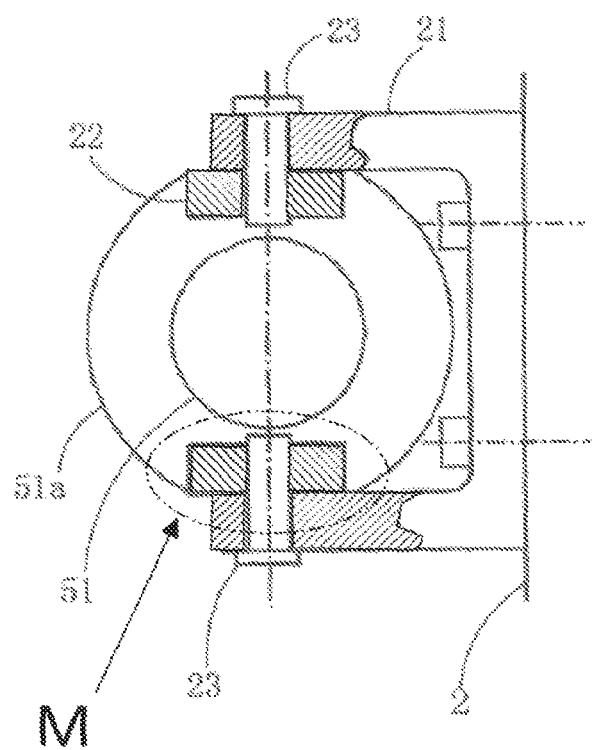
FIG. 15 is a cross-sectional view in the plane H-H in FIG. 14.
Figure 24:
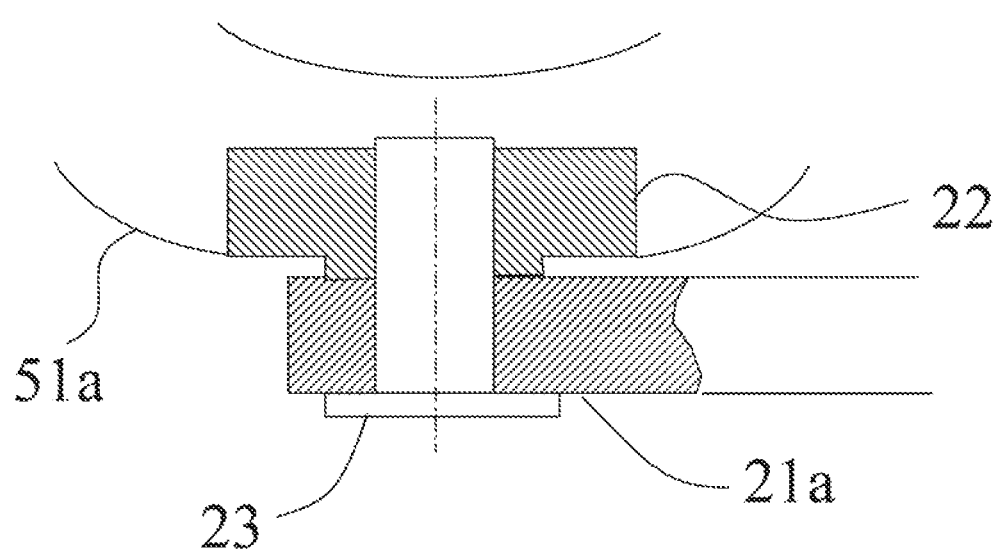
FIG. 24 is an enlarged view of the part M in FIG. 15.
Figure 25:
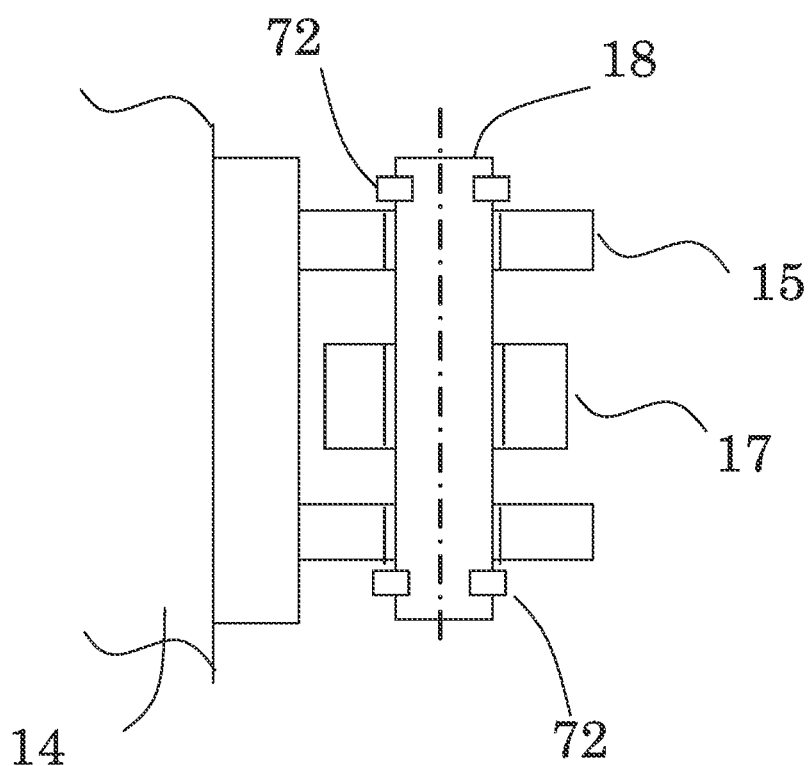
FIG. 25 is a cross-sectional view in the plane N-N in FIG. 5.
Figure 26A:
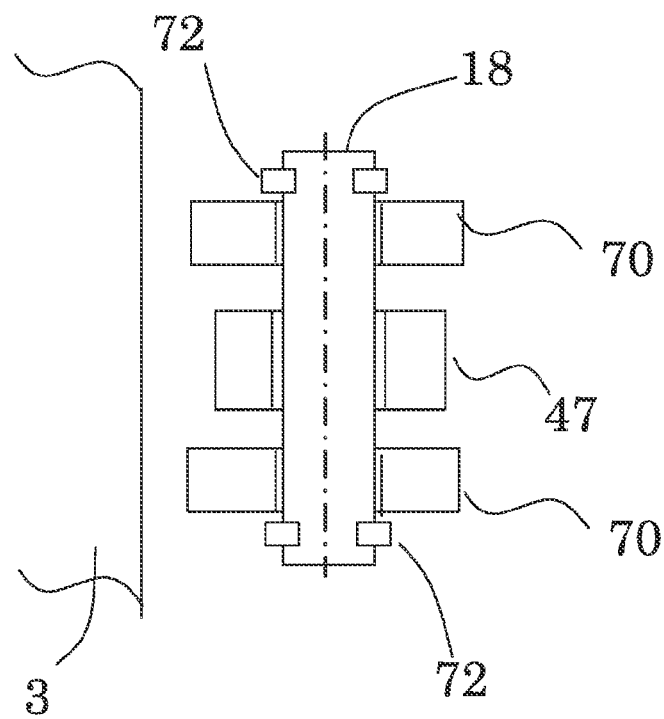
FIG. 26A is a cross-sectional view in the plane P-P in FIG. 22.
Figure 26B:
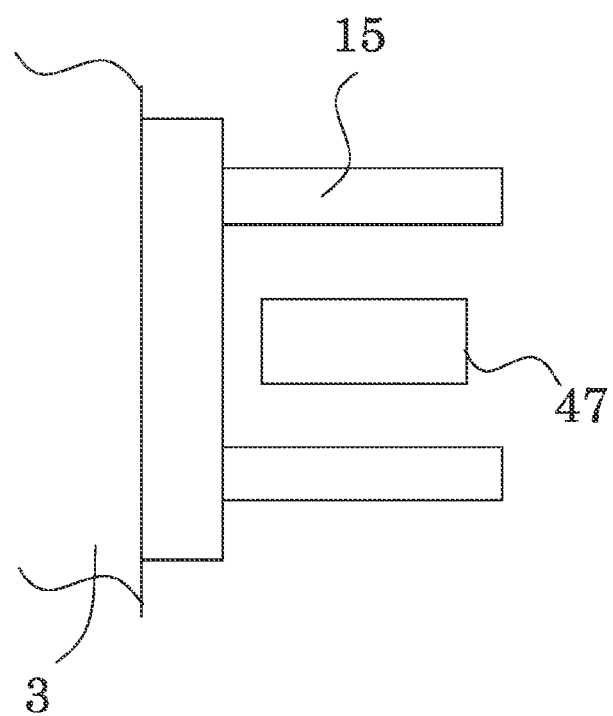
FIG. 26B is a cross-sectional view in the plane Q-Q in FIG. 22.

The second embodiment of the present invention is explained in reference to the drawings. FIG. 13 is a side view of the injection moulder related to the second embodiment of the present invention. FIG. 14 is an enlarged view of the part G in FIG. 13. FIG. 15 is a cross-sectional view in the plane H-H in FIG. 14. FIG. 24 is an enlarged view of the part M in FIG. 15.

As shown in the drawings, the supporting ring 51a of the pin joint connecting device 20 is provided to the hydraulic cylinder 51 for opening and closing the movable platen. A pair of the pin receiving parts 22 is attached to the supporting ring 51a with the fastening bolt 24. One end part of the connecting pin 23 is inserted into the pin receiving part 22. The other end part of the connecting pin 23 is inserted into the pin receiving part 21a which is provided to the pin joint fixing part 21. The pin joint fixing part 21 is provided to the fixing part (on the side surface of the fixed platen 2 in FIG. 13) of the injection moulder.

The hydraulic cylinder 51 can perform angular movement (swing) horizontally centering by the axis of the connecting pin 23 by the pin joint connecting device 20 in response to the inclination and the movement of the fixed platen 2 or movable platen 3. Also, the reliability of the pin joint connecting device 20 and the clevis pin connecting device 30 can be improved, since almost no load of the weight of the hydraulic cylinder 51 is not placed on the operation rod 52.

Also, it is preferable that the pin joint connecting device 20 is provided in the vicinity of the average centroid of the combination of the hydraulic cylinder 51 and the operation rod 52. In this case, the hydraulic cylinder 51 rotates easily about the pin joint. Therefore, the breakage of the operation rod can be suppressed due to the low rotary inertia and the responsive rotation of the hydraulic cylinder 51 even if the movable platen 3 is inclined.

Furthermore, it is preferable to reduce the friction drag, for example by providing a protruding portion in the sliding surface of the pin receiving part 22 to the pin receiving part 21a as shown in FIG. 24, the area of the sliding surface between the pin receiving part 22 and the pin receiving part 21a being reduced. Alternatively, the protruding portion can be provided to the pin receiving part 21a side, instead of on the pin receiving part 22. Alternatively, the protrusion portion can be provided to both of the pin receiving part 22 and the pin receiving part 21a. In this case, there is no obstacle the protruding portion being provided as a component separated from the pin receiving part 22 and the pin receiving part 21a.

INDUSTRIAL APPLICABILITY

The breakage of the actuator due to the slight deformation or the inclination of the movable platen can be prevented in an injection moulder. In addition, a clevis pin supporting structure having a high strength can be designed.

BRIEF DESCRIPTION OF THE REFERENCE SYMBOLS

2: Fixed platen
2a: Clamping cylinder
3: Movable platen
6: Ram
7: Tie bar
11: Guide rail
12: Platen shoe
13: Side shoe
14: Fixing part
15: Clevis pin supporting fork
17, 47: Clevis pin connecting part
18: Clevis pin
20: Pin joint connecting device
21: Pin joint fixing device
22: Pin receiving part
23: Connecting pin
30: Clevis pin connecting device
40: Movable platen shifting device
41: Actuator (hydraulic cylinder)
42: Operation rod
43: Front end part
48: Spherical bush
49: Elastic body

The invention claimed is:

1. A clamping device of an injection moulder comprising:
a fixed platen that is fixed to a base;
a movable platen that moves along at least two guiding sliding parts fixed to the base in parallel with the base, the movable platen facing the fixed platen during the movement; and
a movable platen shifting device that increases and decrease a horizontal distance between the movable platen and the fixed platen, wherein
the movable platen shifting device comprises:
   an actuator that moves the movable platen;
   a clevis pin that connects an end of an operation rod of the actuator and the movable platen;
   a clevis pin holding part that holds a central axis of the clevis pin perpendicular to a moving direction of the movable platen and fixes the clevis pin to the movable platen; and
   a clevis pin connecting part that connects the actuator and the clevis pin, wherein:
   the clevis pin connecting part is a supporting structure configured to rotate with the clevis pin;
   the clevis pin connecting part is supported by the movable platen through the clevis pin holding part;
   the clevis pin, the clevis pin connecting part, and the front end of the actuator are aligned in a straight line;
   the clevis pin has a spherical surface on an outer circumference side surface thereof; and
   the clevis pin connecting part has a spherical surface on an inner circumference surface thereof facing the clevis pin, the spherical surface of the clevis pin connecting part fitting to the spherical surface of the clevis pin slidably.

2. The clamping device of an injection moulder according to claim 1, wherein
the spherical surface of the clevis pin is a convex surface; and
the spherical surface of the clevis pin connecting part is a concave surface.

3. The clamping device of an injection moulder according to claim 1, wherein the clevis pin is a structure in which a cylindrical part and a spherical bush are fitted;

the spherical bush has a circular hole, to which the cylindrical part is fixed and fitted slidably; and the spherical bush has a spherical surface on an outer circumference surface thereof.

4. The clamping device of an injection moulder according to claim 1, wherein the clevis pin connecting part and the front end of the actuator is continuously connected with a fastening structure.

5. The clamping device of an injection moulder according to claim 1, wherein the clevis pin is held on the clevis pin holding part at an opposite side part relative to the fixed platen directly or through a connecting block.

6. The clamping device of an injection moulder according to claim 1, wherein:

a circumferentially-directed groove is formed at the front end part of the actuator;

a truncated cone shape coaxial to the actuator is formed at an end surface of the actuator;

the clevis pin connecting part comprises a coupling part, which fits to the circumferentially-directed groove at the front end part of the actuator to engage, and a facing surface, which faces the truncated cone shape at the front end of the actuator;

a space is formed between the front end of the actuator and the coupling part at least in a axis direction or a radial direction; and the front end of the actuator is slidably connected to the coupling part.

7. The clamping device of an injection moulder according to claim 1, wherein a circumferentially-directed groove is formed at the front end part of the actuator;

a convex spherical end surface coaxial to the actuator is formed at an end surface of the actuator;

the clevis pin connecting part comprises a coupling part, which fits to the circumferentially-directed groove at the front end part of the actuator to engage, and a concave spherical surface, which has a larger diameter than a diameter of the convex spherical end surface at the end surface of the actuator in a facing surface thereof facing the convex spherical end surface at the front end part of the actuator;

a space is formed between the front end of the actuator and the coupling part at least in a axis direction or a radial direction; and the front end of the actuator is slidably connected to the coupling part.

8. The clamping device of an injection moulder according to claim 6 or 7, wherein the movable platen is moved by abutting a peak surface of the truncated cone shape or the convex spherical surface at the front end of the actuator to the clevis pin connecting part when the movable platen moves away from the fixed platen.

9. The clamping device of an injection moulder according to claim 1, further comprising a plurality of pairs of movable platen shifting devices, wherein at least one pair of movable platen shifting devices is provided below a horizontal center line of the movable platen.

10. The clamping device of an injection moulder according to claim 1, further comprising four tie bars, each of which penetrates though each four corners of the fixed platen and the movable platen, and mold clamping cylinders, which generate cramping force by pulling the tie bars and embedded in the fixed platen, wherein one ends of the tie bars are inserted into the mold clamping cylinders, and other ends of the tie bars are free and in a cantilevered structure.

11. The clamping device of an injection moulder according to claim 1, wherein the actuator moving the movable platen is a hydraulic actuator.

12. The clamping device of an injection moulder according to claim 1, wherein the actuator moving the movable platen is driven by an electric motor.

13. The clamping device of an injection moulder according to claim 11 or 12, wherein a mounting structure of the actuator moving the movable platen on the fixed platen or the base comprises:

a pin, a central axis of which is in the same direction of the central axis of the clevis pin fixed on a side of the fixed platen or a side of the base;

a first pin joint connecting part fixing the pin to the side of the fixed platen or the side of the base; and a second pin joint connecting part, which is fixed on a side of the actuator and supports the pin.

\* \* \* \* \*